US012087945B2

(12) United States Patent
Lee et al.

(10) Patent No.: US 12,087,945 B2
(45) Date of Patent: Sep. 10, 2024

(54) CATHODE ACTIVE MATERIAL FOR LITHIUM SECONDARY BATTERY AND LITHIUM SECONDARY BATTERY INCLUDING THE SAME

(71) Applicant: SK INNOVATION CO., LTD., Seoul (KR)

(72) Inventors: Sang Han Lee, Daejeon (KR); Min Gu Kang, Daejeon (KR); Jeong Bae Yoon, Daejeon (KR); Yong Hyun Cho, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 291 days.

(21) Appl. No.: 17/338,317

(22) Filed: Jun. 3, 2021

(65) Prior Publication Data

US 2021/0384505 A1 Dec. 9, 2021

(30) Foreign Application Priority Data

Jun. 4, 2020 (KR) ........................ 10-2020-0067818
Feb. 8, 2021 (KR) ........................ 10-2021-0017376

(51) Int. Cl.
*H01M 4/525* (2010.01)
*H01M 4/02* (2006.01)
*H01M 10/0525* (2010.01)

(52) U.S. Cl.
CPC ....... *H01M 4/525* (2013.01); *H01M 10/0525* (2013.01); *H01M 2004/021* (2013.01); *H01M 2004/028* (2013.01)

(58) Field of Classification Search
CPC ..................................................... H01M 4/525
See application file for complete search history.

(56) References Cited

U.S. PATENT DOCUMENTS

| 9,698,420 | B2 | 7/2017 | Ishizaki et al. | |
|---|---|---|---|---|
| 2016/0133927 | A1* | 5/2016 | Kamata | H01M 4/505 252/182.1 |
| 2016/0211517 | A1 | 7/2016 | Beck et al. | |
| 2018/0316005 | A1 | 11/2018 | Shin et al. | |

(Continued)

FOREIGN PATENT DOCUMENTS

| CN | 107403905 A | 11/2017 |
|---|---|---|
| CN | 110431695 A | 11/2019 |

(Continued)

OTHER PUBLICATIONS

Office Action issued by the Chinese Patent Office on Nov. 22, 2021.
(Continued)

*Primary Examiner* — Nathanael T Zemui
(74) *Attorney, Agent, or Firm* — IP & T GROUP LLP

(57) ABSTRACT

A cathode active material for a lithium secondary battery including a lithium-transition metal composite oxide particle is provided. A crystal grain size of the lithium-transition metal composite oxide particle measured by an XRD analysis is 250 nm or more, and an XRD peak intensity ratio of the lithium-transition metal composite oxide particle is 9.8% or less. A lithium secondary battery including the lithium-transition metal composite oxide particle and having improved life-span and rate capability is provided.

17 Claims, 1 Drawing Sheet

(56) References Cited

U.S. PATENT DOCUMENTS

| | | | |
|---|---|---|---|
| 2020/0119342 A1 | 4/2020 | Watanabe et al. | |
| 2020/0388830 A1* | 12/2020 | Lee | H01M 4/505 |
| 2021/0119258 A1* | 4/2021 | Zou | H01M 10/0567 |
| 2021/0167366 A1* | 6/2021 | Leng | C30B 29/22 |

FOREIGN PATENT DOCUMENTS

| | | |
|---|---|---|
| CN | 110915032 A | 3/2020 |
| JP | 4599050 B2 | 12/2010 |
| JP | 2011-228292 A | 11/2011 |
| JP | 6471025 B2 | 2/2019 |
| KR | 10-2016-0037878 A | 4/2016 |
| KR | 10-2017-0093085 A | 8/2017 |
| KR | 10-1914560 B1 | 11/2018 |
| KR | 10-2019-0032126 A | 3/2019 |
| KR | 10-1966144 B1 | 4/2019 |
| KR | 10-2019-0099534 A | 8/2019 |
| KR | 10-2019-0139033 A | 12/2019 |
| KR | 10-2020-0110027 A | 9/2020 |
| WO | 2013-025328 A2 | 2/2013 |
| WO | 2017-170548 A1 | 10/2017 |

OTHER PUBLICATIONS

Fey G T-K et al: "Synthesis characterization, and cell performance of LiNiVO"4 cathode materials prepared by a new solution precipitation method", Journal of Power Sources, Elsevier SA, CH, vol. 81-82, Sep. 1, 1999 (Sep. 1, 1999), pp. 467-471.

Extended European Search Report issued by the European Patent Office on Nov. 2, 2021.

* cited by examiner

CATHODE ACTIVE MATERIAL FOR LITHIUM SECONDARY BATTERY AND LITHIUM SECONDARY BATTERY INCLUDING THE SAME

CROSS-REFERENCE TO RELATED APPLICATION AND CLAIM OF PRIORITY

This application claims priority to Korean Patent Applications No. 10-2020-0067818 filed on Jun. 4, 2020 and No. 10-2021-0017376 filed on Feb. 8, 2021 in the Korean Intellectual Property Office (KIPO), the entire disclosure of which is incorporated by reference herein.

BACKGROUND

1. Field

The present invention relates to a cathode active material for a lithium secondary battery and a lithium secondary battery including the same. More particularly, the present invention relates to a cathode active material including a lithium-transition metal complex oxide for a lithium secondary battery and a lithium secondary battery including the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer (separator), and an electrolyte immersing the electrode assembly. The lithium secondary battery may further include an outer case having, e.g., a pouch shape.

A lithium metal oxide may be used as a cathode active material of the lithium secondary battery preferably having high capacity, power and life-span. However, if the lithium metal oxide is designed to have a high-power composition, thermal and mechanical stability of the lithium secondary battery may be degraded to also deteriorate life-span property and operational reliability.

For example, Korean Publication of Patent Application No. 10-2017-0093085 discloses a cathode active material including a transition metal compound and an ion adsorbing binder, which may not provide sufficient life-span and stability.

SUMMARY

According to an aspect of the present invention, there is provided a cathode active material for a lithium secondary battery having improved operational stability and reliability.

According to an aspect of the present invention, there is provided a lithium secondary battery including a cathode active material with improved operational stability and reliability.

According to exemplary embodiments, a cathode active material for a lithium secondary battery includes a lithium-transition metal composite oxide particle. A crystal grain size of the lithium-transition metal composite oxide particle measured by an XRD analysis is 250 nm or more, and an XRD peak intensity ratio defined by Equation 2 of the lithium-transition metal composite oxide particle is 9.8% or less.

$$\text{XRD peak intensity ratio (\%)} = 100 \times I(110)/\{I(110)+I(003)\} \quad \text{[Equation 2]}$$

In Equation 2, 4110) is a maximum height of a peak corresponding to a (110) plane by the XRD analysis of the lithium-transition metal composite oxide particle, and I(003) is a maximum height of a peak corresponding to a (003) plane by the XRD analysis of the lithium-transition metal composite oxide particle.

In some embodiments, the crystal grain size may be measured by Equation 1 below:

$$L = \frac{0.9\lambda}{\beta \cos\theta} \quad \text{[Equation 1]}$$

In Equation 2 above, L is the crystal grain size, $\lambda$ is an X-ray wavelength, $\beta$ is a half width of a peak corresponding to the (003) plane, and $\theta$ is a diffraction angle.

In some embodiments, the crystal grain size of the lithium-transition metal composite oxide particles may be in a range from 250 nm to 1000 nm.

In some embodiments, the crystal grain size of the lithium-transition metal composite oxide particles may be in a range from 300 nm to 1000 nm.

In some embodiments, the XRD peak intensity ratio of the lithium-transition metal composite oxide particle may be in a range from 4 to 9.8.

In some embodiments, an XRD peak area ratio defined by Equation 3 of the lithium-transition metal composite oxide particle may be 17% or less:

$$\text{XRD peak area ratio (\%)} = 100 \times A(110)/\{A(110)+A(003)\} \quad \text{[Equation 3]}$$

In Equation 3, A(110) is a peak area of a peak corresponding to the (110) plane by the XRD analysis of the lithium-transition metal composite oxide particle, and A(003) is a peak area of a peak corresponding to the (003) plane by the XRD analysis of the lithium-transition metal composite oxide particle.

In some embodiments, the XRD peak area ratio of the lithium-transition metal composite oxide particle may be in a range from 10% to 17%.

In some embodiments, the cathode active material may include a first lithium-transition metal composite oxide particle and a second lithium-transition metal composite oxide particle having a secondary particle structure. A crystal grain size of the first lithium-transition metal composite oxide particle measured by an XRD analysis may be 250 nm or more, and the XRD peak intensity ratio of the first lithium-transition metal composite oxide particle may be 9.8% or less.

In some embodiments, the first lithium-transition metal composite oxide particle may have a single particle shape having a crystallographic single crystal or polycrystalline structure.

In some embodiments, the second lithium-transition metal composite oxide particle may have a crystal grain size less than 250 nm measured by the XRD analysis.

In some embodiments, the XRD peak intensity ratio of the second lithium-transition metal composite oxide particle may exceed 9.8%.

In some embodiments, a weight ratio of the first lithium-transition metal composite oxide particle and the second lithium-transition metal composite oxide particle may be from 3:7 to 7:3.

In some embodiments, a particle diameter (D50) of the second lithium-transition metal composite oxide particle may be larger than a particle diameter of the first lithium-transition metal composite oxide particle.

In some embodiments, the lithium-transition metal composite oxide particle may have a composition represented by Chemical Formula 1:

In Chemical Formula 1, 0.9≤x≤1.2, 0.6≤a≤0.99, −0.1≤z≤0.1, and M may be at least one element selected from the group consisting of Na, Mg, Ca, Y, Ti, Zr, Hf, V, Nb, Ta, Cr, Mo, W, Mn, Co, Fe, Cu, Ag, Zn, B, Al, Ga, C, Si, Sn and Zr.

In some embodiments, 0.8≤a≤0.95 in Chemical Formula 1.

According to exemplary embodiments, a lithium secondary battery includes a cathode including a cathode active material layer that includes the cathode active material as described above, and an anode facing the cathode.

In some embodiments, the cathode active material may include first lithium-transition metal composite oxide particles and second lithium-transition metal composite oxide particles having a secondary particle shape. A crystal grain size of the first lithium-transition metal composite oxide particles measured by an XRD analysis may be 250 nm or more, and the XRD peak intensity ratio of the first lithium-transition metal composite oxide particles may be 9.8% or less.

In some embodiments, a ratio of a cross-sectional area of the first lithium-transition metal composite oxide particles and a cross-sectional area of the second lithium-transition metal composite oxide particles in a scanning electron microscope (SEM) cross-section of the cathode active material layer may be from 1:4.5 to 4.5:1.

In some embodiments, a ratio of a cross-sectional area of the first lithium-transition metal composite oxide particles and a cross-sectional area of the second lithium-transition metal composite oxide particles in a scanning electron microscope (SEM) cross-section of the cathode active material layer may be from 2:3.7 to 3.7:2.

The lithium secondary battery according to the above-described exemplary embodiments may include a lithium-transition metal composite oxide particle having a crystal grain size of 250 nm or more and satisfying an XRD peak intensity ratio and/or an XRD peak area ratio less than or equal to a predetermined value as a cathode active material. Accordingly, a contact area between particles may be reduced, and a particle strength may be increased.

The crystal grain size may be increased to 250 nm or more, so that the space/contact area between particles or between crystals may be reduced. Thus, particle cracks in an electrode pressing process may be prevented, and a gas generation during repetitive charging and discharging may be also prevented, thereby improving life-span properties of the secondary battery.

Further, the XRD peak ratios may be controlled below a predetermined value so that a lithium diffusion distance may be decreased. Accordingly, a lithium secondary battery with improved life-span and power properties may be achieved while suppressing power degradation due to an increase in a grain size.

For example, the lithium-transition metal composite oxide particle may contain a high-Ni composition to provide increased power and capacity, and may have the above-described grain size to provide improved operation stability and life-span property.

DETAILED DESCRIPTION OF THE EMBODIMENTS

According to example embodiments of the present invention, a lithium secondary battery including a lithium-transition metal composite oxide particle having a crystal grain size and an XRD peak ratio of a predetermined range as a cathode active material is provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
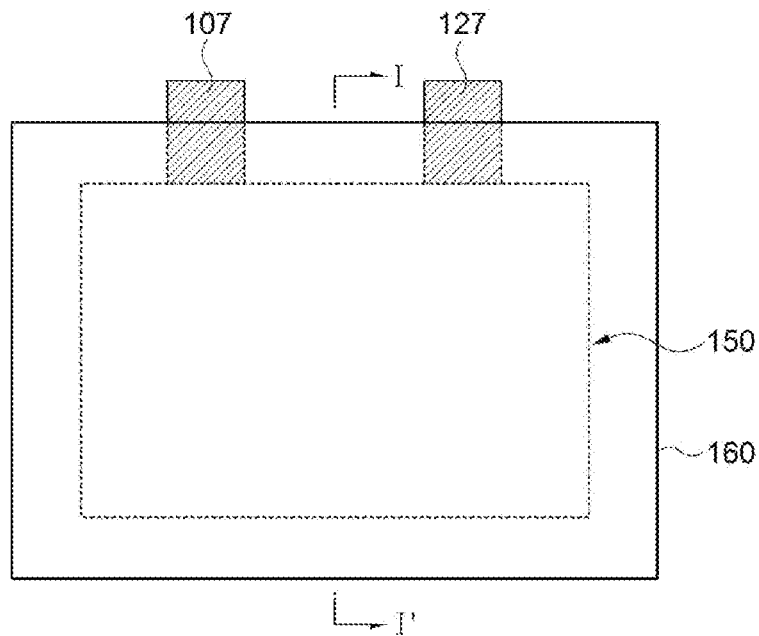
FIGS. 1 and 2 are a schematic top planar view and a schematic cross-sectional view, respectively, illustrating a lithium secondary battery in accordance with exemplary embodiments.
Figure 2:
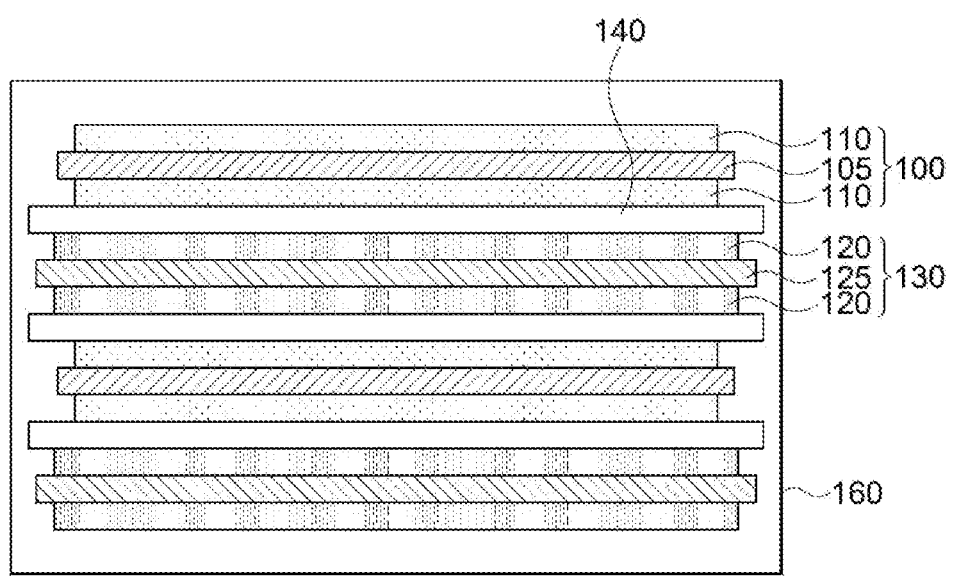

FIGS. 1 and 2 are a schematic top planar view and a schematic cross-sectional view, respectively, illustrating a lithium secondary battery in accordance with exemplary embodiments. Hereinafter, a cathode active material for a lithium secondary battery and a lithium secondary battery including the same will be described with reference to FIGS. 1 and 2.

Referring to FIGS. 1 and 2, a lithium secondary battery may include an electrode assembly that may include a cathode 100, an anode 130 and a separation layer 140 interposed between the cathode 100 and the anode 130. The electrode assembly may be inserted in a case 160 together with an electrolyte to be immersed therein.

The cathode 100 may include a cathode active material layer 110 formed by coating a cathode active material on a cathode current collector 105. The cathode active material may include a compound capable of reversibly intercalating and de-intercalating lithium ions.

In exemplary embodiments, the cathode active material may include lithium-transition metal composite oxide particles. For example, the lithium-transition metal composite oxide particle may include nickel (Ni), and may further include at least one of cobalt (Co) and manganese (Mn).

For example, the lithium-transition metal composite oxide particle may be represented by Chemical Formula 1 below.

In Chemical Formula 1, 0.9≤x≤1.2, 0.6≤a≤0.99, and −0.1≤z≤0.1. M may represent at least one element selected from Na, Mg, Ca, Y, Ti, Zr, Hf, V, Nb, Ta, Cr, Mo, W, Mn, Co, Fe, Cu, Ag, Zn, B, Al, Ga, C, Si, Sn or Zr.

Preferably, a molar ratio of Ni (a) in Chemical Formula 1 may be 0.8 or more, e.g., 0.8≤a≤0.95. In an embodiment, the molar ratio of Ni (a) may exceed 0.8.

Ni may serve as a transition metal related to power and capacity of a lithium secondary battery. Thus, as described above, a high-Ni composition may be applied to the lithium-transition metal composite oxide particle so that high-power cathode and lithium secondary battery may be provided.

However, as a content of Ni increases, long-term storage stability and life-span stability of the cathode or the secondary battery may be relatively deteriorated. However, according to exemplary embodiments, life stability and capacity retention properties may be improved by employing Mn while maintaining electrical conductivity by including Co.

In some embodiments, the cathode active material or the lithium-transition metal composite oxide particle may further include a coating element or a doping element. For example, the coating element or the doping element may include Al, Ti, Ba, Zr, Si, B, Mg, P, an alloy thereof or an oxide thereof. These may be used alone or in combination thereof. The cathode active material particles may be passivated by the coating or doping element, stability and life-span properties against a penetration of an external object may be further improved.

According to exemplary embodiments, a crystal grain size of the lithium-transition metal composite compound particle may be 250 nm or more.

For example, as represented by Chemical Formula 1, when the content of Ni in the lithium-transition metal composite oxide particle is relatively increased (e.g., a Ni-rich composition), high capacity and power properties may be easily implemented.

However, in this case, mechanical strength and chemical stability of the cathode active material may be deteriorated, and thus particle cracks may occur during, e.g., a pressing process for forming the cathode active material layer 110. Accordingly, the electrolyte may penetrate into the particles, and a gas may be generated due to a side reaction.

Additionally, according to repeated charging and discharging operations, volume contraction/expansion of the cathode active material may be repeated. Accordingly, the particle cracks may be further generated in the case of the high-Ni cathode active material.

However, according to exemplary embodiments, a lithium-transition metal composite oxide having a crystal grain size of 250 nm or more may be employed to increase particle strength and reduce the particle cracks by reducing inter-crystal grains or inter-particle boundary regions.

Thus, a gas generation due to the repeated charging/discharging may be suppressed, and a crack generation due to the volume contraction/expansion may also be prevented. Therefore, stable capacity properties may be provided while enhancing the life-span property of the lithium secondary battery even in a high temperature environment.

In exemplary embodiments, "a crystal grain size" is a value measured through an X-ray diffraction (XRD) analysis. The crystal grain size may be calculated and obtained from Scherrer equation (Equation 1 below) using a half-width (FWHM) obtained through the XRD analysis.

$$L = \frac{0.9\lambda}{\beta \cos\theta} \quad \text{[Equation 1]}$$

In the Equation 1 above, L is the crystal grain size, $\lambda$ is an X-ray wavelength, $\beta$ is the half width of a corresponding peak, and $\theta$ is a diffraction angle. In exemplary embodiments, the half width in the XRD analysis for measuring the crystal grain size may be measured from a peak of a (003) plane.

In some embodiments, in the Equation 1 above, $\beta$ may be a half-width correcting a value derived from a device. In an embodiment, Si may be used as a standard material for reflecting the device-derived value. In this case, a half-width profile of Si over an entire $2\theta$ range may be fitted, and the device-derived half-width may be expressed as a function of $2\theta$. Thereafter, a value obtained by subtracting and correcting the half width value derived from the device in the corresponding $2\theta$ obtained from the above function may be used as $\beta$.

If the crystal grain size is excessively increased, the power property of the lithium-transition metal composite compound particles may be deteriorated. In exemplary embodiments, the crystal grain size may be in a range from 250 nm to 1000 nm. Within the above range, thermal stability and life-span properties may be effectively maintained while sufficiently implementing high power and high capacity from the high-Ni composition. In a preferable embodiment, the crystal grain size may be in a range from 300 nm to 1,000 nm. For example, the crystal grain size may be in a range from 350 nm to 600 nm.

For example, a nickel-manganese-cobalt precursor (e.g., nickel-cobalt-manganese hydroxide) and a lithium precursor (e.g., lithium hydroxide or lithium carbonate) may be reacted by a wet mixing or a dry mixing, and then a reacted product may be fired to prepare the lithium-transition metal composite oxide particle.

In an embodiment, the crystal grain size of the lithium-transition metal composite oxide particle may be controlled by adjusting a firing temperature.

The lithium-transition metal composite oxide particles may have a single crystal and/or polycrystalline structure in a crystallographic aspect. In an embodiment, the cathode active material may include a mixture or a blend of single crystal particles and polycrystalline particles having the aforementioned crystal grain size.

The lithium-transition metal composite oxide particles may have a single particle shape or a primary particle shape in a morphological aspect.

The term "single particle shape" herein may be used to exclude a secondary particle structure in which a plurality of primary particles may be agglomerated or combined with each other. In an embodiment, the single particle shape may include a monolithic shape in which several (e.g., 2 to 10) independent particles are adjacent or attached to each other.

According to exemplary embodiments, the lithium-transition metal composite oxide particle may have an XRD peak intensity ratio defined by Equation 2 below of 9.8% or less.

$$\text{XRD peak intensity ratio (\%)} = 100 \times I(110)/\{I(110)+I(003)\} \quad \text{[Equation 2]}$$

In Equation 2, I(110) represents a peak intensity or a maximum height of a (110) plane by X-ray diffraction (XRD) analysis of the lithium-transition metal composite oxide particle, and I(003) represents a peak intensity or a maximum height of a (003) plane by the XRD analysis of the lithium-transition metal composite oxide particle.

For example, the XRD analysis may be performed using a Cu K$\alpha$ ray as a light source for a dried powder of the lithium-transition metal composite oxide particles, in a range of diffraction angle ($2\theta$) of 10° to 120° at a scan rate of 0.0065°/step.

In the above-described XRD peak intensity ratio range, an ion propagation length and an ion diffusion length on the (110) plane through which lithium ions are diffused may be reduced. Additionally, the ratio of the peak intensity relative to the (003) plane that intersects the (110) plane may be adjusted to reflect an aspect ratio of the particles.

Accordingly, a power degradation due to an increase of the lithium diffusion length or an excessive increase of the particle aspect ratio may be prevented. Additionally, as described above, the relative reduction of the power/capacity due to increasing the crystal grain size to 250 nm or more, preferably 300 nm or more, may be alleviated or supplemented by adjusting the XRD peak intensity ratio.

Therefore, the life-span stability may be enhanced by preventing the gas generation due to particle cracks through the crystal grain size control, and a mobility of a lithium ion may be increased through the adjustment of the XRD peak intensity ratio to also increase the power/capacity.

In an embodiment, the XRD peak intensity ratio may be from 4 to 9.8, preferably from 5 to 9.8. Within the above range, the power property may be enhanced while maintaining a surface stability and the life-span property of the lithium-transition metal composite oxide particle.

In some embodiments, the lithium-transition metal composite oxide particle may have an XRD peak area ratio defined by Equation 3 below of 17% or less.

$$XRD \text{ peak area ratio } (\%) = 100 \times A(110)/\{A(110)+A(003)\} \qquad \text{[Equation 3]}$$

In Equation 3, A(110) represents a peak area of the (110) plane by the XRD analysis of the lithium-transition metal composite oxide particle, and A(003) represents a peak area of the (003) plane by the XRD analysis of the lithium-transition metal composite oxide particle.

The peak area ratio may be controlled together with the above-described peak intensity ratio, so that the effect of controlling the diffusion length of the lithium ion and the aspect ratio through the XRD value may be more sufficiently implemented.

In a preferable embodiment, the XRD peak area ratio may be from 10% to 17%, more preferably from 12% to 17%.

For example, a transition metal precursor (e.g., a Ni—Co—Mn precursor) for preparing the lithium-transition metal composite oxide particle may be prepared through a co-precipitation reaction.

The above-described transition metal precursor may be prepared through a co-precipitation reaction of metal salts. The metal salts may include a nickel salt, manganese salt and a cobalt salt.

Examples of the nickel salt may include nickel sulfate, nickel hydroxide, nickel nitrate, nickel acetate, hydrates thereof, etc. Examples of the manganese salt may include manganese sulfate, manganese acetate, hydrates thereof, etc. Examples of the cobalt salt may include cobalt sulfate, cobalt nitrate, cobalt carbonate, hydrates thereof, etc.

The metal salts may be mixed with a precipitating agent and/or a chelating agent in a ratio that may satisfy a content or a concentration ratio of each metal described with reference to Chemical Formula 1 to prepare an aqueous solution. The aqueous solution may be co-precipitated in a reactor to prepare the transition metal precursor.

The precipitating agent may include an alkaline compound such as sodium hydroxide (NaOH), sodium carbonate ($Na_2CO_3$), etc. The chelating agent may include, e.g., aqueous ammonia (e.g., $NH_3H_2O$), ammonium carbonate (e.g., $NH_3HCO_3$), or the like.

For example, a temperature of the co-precipitation reaction may be adjusted in a range from about 40° C. to 60° C. A reaction time may be adjusted in a range from about 24 to 72 hours.

For example, the lithium-transition metal composite oxide particle may be prepared by reacting the transition metal precursor and a lithium precursor with each other. The lithium precursor compound may include, e.g., lithium carbonate, lithium nitrate, lithium acetate, lithium oxide, lithium hydroxide, or the like. These may be used alone or in combination thereof.

Thereafter, for example, lithium impurities or unreacted precursors may be removed through a washing process, and metal particles may be fixed or crystallinity may be increased through a heat treatment (firing) process. In an embodiment, a temperature of the heat treatment may be in a range from about 600° C. to 1000° C.

For example, the above-described XRD peak ratio may be changed according to the above-described co-precipitation reaction time, the reaction temperature, heat treatment temperature, or the like.

In some embodiments, the cathode active material may further include an active material having a morphologically secondary particle shape together with the lithium-transition metal composite oxide particle having the above-described crystal grain size and XRD peak ratio.

For example, the cathode active material may include a first lithium-transition metal composite oxide particle and a second lithium-transition metal composite oxide particle. The first lithium-transition metal composite oxide particle may have a single crystal or polycrystalline structure having a single particle shape, and may have the above-described crystal grain size and XRD peak ratio. The second lithium-transition metal composite oxide particle may have a composition of Chemical Formula 1 and may have a secondary particle structure.

In an embodiment, a crystal grain size of the second lithium-transition metal composite oxide particle may be less than 250 nm. In an embodiment, an XRD peak intensity ratio of the second lithium-transition metal composite oxide particle may exceed 9.8.

In an embodiment, the second lithium-transition metal composite oxide particle may include a concentration gradient region between a center of the particle and a surface of the particle. In this case, for example, a concentration or molar ratio of Ni may decrease in the concentration gradient region in a direction from the center of the particle to the surface of the particle.

In this case, a concentration of Mn or Co may increase in the concentration gradient region in a direction from the center of the particle to the surface of the particle.

When the first lithium-transition metal composite oxide particle and the second lithium-transition metal composite oxide particle are used together, a mixing weight ratio (the first lithium-transition metal composite oxide particle: the second lithium-transition metal composite oxide particle) may be from 1:9 to 9:1.

In an embodiment, a ratio of a cross-sectional area (a sum of cross-sectional areas of the particles) of the first lithium-transition metal composite oxide particles and a cross-sectional area (a sum of the cross-sectional areas of the particles) of the second lithium-transition metal composite oxide particles in a scanning electron microscope (SEM) cross section of the cathode active material layer 110 may be from 1:4.5 to 4.5:1.

In a preferable embodiment, the weight ratio may be adjusted in a range from 3:7 to 7:3 to achieve a balance between sufficient power and life-span properties through the above-described crystal grain size and XRD peak ratio.

In an embodiment, the ratio of the cross-sectional area of the first lithium-transition metal composite oxide particles and the cross-sectional area of the second lithium-transition metal composite oxide particles in a scanning electron microscope (SEM) cross-section of the cathode active material layer 110 may be from 2:3.7 to 3.7:2.

As described above, even when the lithium-transition metal composite oxide particles in the form of high-Ni secondary particles having a relatively small crystal grain size are used, mechanical and thermal stability may be enhanced throughout the cathode active material to provide the stable life-span property by employing the first lithium-transition metal composite oxide particle.

In an embodiment, a particle diameter (D50) of the lithium-transition metal composite oxide particles (e.g., an average particle diameter in a cumulative volume distribution) may be from about 1 μm to 20 μm. If the first lithium-transition metal composite oxide particle and the second lithium-transition metal composite oxide particle are used together, a particle diameter of the second lithium-transition metal composite oxide particle may be greater than a particle diameter of the first lithium-transition metal composite oxide particle.

For example, the particle diameter of the first lithium-transition metal composite oxide particle may be from about 1 μm to 10 μm, and preferably from about 3 μm to 7 μm. The particle diameter of the second lithium-transition metal composite oxide particle may be from about 11 μm to 20 μm, preferably from about 11 μm to 16 μm.

In an embodiment, a specific surface area (BET) of the lithium-transition metal composite oxide particle may be from about 0.1 $m^2/g$ to 1 $m^2/g$.

The cathode active material particle including the above-mentioned lithium-transition metal composite oxide particle may be mixed and stirred together with a binder, a conductive agent and/or a dispersive agent in a solvent to form a slurry. The slurry may be coated on the cathode current collector 105, and dried and pressed to obtain the cathode 100.

The cathode current collector 105 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer may be reduced, and an amount of the cathode active material may be relatively increased. Thus, capacity and power of the secondary battery may be further improved.

The conductive agent may be added to facilitate an electron mobility between the active material particles. For example, the conductive agent may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$.

In exemplary embodiments, the anode 130 may include an anode current collector 125 and an anode active material layer 120 formed by coating an anode active material on the anode current collector 125.

The anode active material may include a material that may be capable of adsorbing and ejecting lithium ions. For example, a carbon-based material such as a crystalline carbon, an amorphous carbon, a carbon complex or a carbon fiber, a lithium alloy, a silicon-based compound, tin, etc., may be used. The amorphous carbon may include a hard carbon, cokes, a mesocarbon microbead (MCMB), a mesophase pitch-based carbon fiber (MPCF), etc.

The crystalline carbon may include a graphite-based material, such as natural graphite, artificial graphite, graphitized cokes, graphitized MCMB, graphitized MPCF, etc. The lithium alloy may further include aluminum, zinc, bismuth, cadmium, antimony, silicon, lead, tin, gallium, or indium.

The silicon-based compound may include, e.g., silicon oxide or a silicon-carbon composite compound such as silicon carbide (SiC).

For example, the anode active material may be mixed and stirred together with a binder, a conductive agent and/or a dispersive agent in a solvent to form a slurry. The slurry may be coated on at least one surface of the anode current collector 125, and dried and pressed to obtain the anode 130.

The binder and the conductive agent substantially the same as or similar to those used in the cathode active material layer 110 may be used. In some embodiments, the binder for the anode may include an aqueous binder such as such as styrene-butadiene rubber (SBR) that may be used with a thickener such as carboxymethyl cellulose (CMC) so that compatibility with the carbon-based active material may be improved.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also be formed from a non-woven fabric including a glass fiber with a high melting point, a polyethylene terephthalate fiber, or the like.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without loss by, e.g., precipitation or sedimentation.

In exemplary embodiments, an electrode cell may be defined by the cathode 100, the anode 130 and the separation layer 140, and a plurality of the electrode cells may be stacked to form an electrode assembly having, e.g., a jelly roll shape. For example, the electrode assembly 150 may be formed by winding, laminating or folding of the separation layer 140.

The electrode assembly 150 may be accommodated in a case 160 together with an electrolyte to form the lithium secondary battery. In exemplary embodiments, the electrolyte may include a non-aqueous electrolyte solution.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

As illustrated in FIG. 1, electrode tabs (a cathode tab and an anode tab) may protrude from the cathode current collector 105 and the anode current collector path 125 of each electrode cell to extend to a side of the case 160. The electrode tabs may be fused together with the side of the case 160 to form an electrode lead (a cathode lead 107 and an anode lead 127) extending or exposed to an outside of the case 160.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Preparation of First Lithium-Transition Metal Composite Oxide Particle $NiSO_4$, $CoSO_4$ and MnSCfi were mixed in a ratio of 0.8:0.1:0.1, respectively, using distilled water from which internal dissolved oxygen was removed by bubbling with $N_2$ for 24 hours. The solution was added to a reactor at 50° C., and a co-precipitation reaction was performed for 48 hours using NaOH and $NH_3H_2O$ as a precipitating agent and chelating agent to obtain $Ni_{0.8}Co_{0.1}Mn_{0.1}(OH)_2$ as a transition metal precursor. The obtained precursor was dried at 80° C. for 12 hours and then dried again at 110° C. for 12 hours.

Lithium hydroxide and the transition metal precursor were added to a dry high-speed mixer in a ratio of 1.05:1 and uniformly mixed for 5 minutes. The mixture was put in a kiln and heated to 950° C. at a heating rate of 2° C./min, and maintained at 950° C. for 10 hours. Oxygen was passed through continuously at a flow rate of 10 mL/min during the heating and maintaining. After the completion of the firing, natural cooling was performed to room temperature, pulverized and distributed to achieve the first lithium-transition metal composite oxide particle of a single particle shape (including single crystal and polycrystalline structures) as a cathode active material represented by $LiNi_{0.8}Co_{0.1}Mn_{0.1}O_2$ (Particle 1-1).

A reaction time or a reaction temperature in the reactor, or a firing time or a firing temperature in the firing process were changed to further prepare particles 1-2 to 1-4. For each of the first lithium-transition metal composite oxide particles, an XRD analysis was performed to calculate the crystal grain size using the above-described Equation 1 and calculate the XRD peak ratio.

Preparation of Second Lithium-Transition Metal Composite Oxide Particle

A nickel precursor ($NiSO_4$), a manganese precursor (MnSCL) and a cobalt precursor ($CoSO_4$) were mixed by continuously changing a mixing ratio to form a precipitate such that a concentration gradient region was formed between a particle center and a particle surface. A total composition was $LiNi_{0.80}Co_{0.11}Mn_{0.09}O_2$, a composition of the particle center was $LiNi_{0.802}Co_{0.11}Mn_{0.088}O_2$, and a composition of the particle surface was $LiNi_{0.77}Co_{0.11}Mn_{0.12}O_2$. A second lithium-transition metal composite oxide particle (Particle 2-1) having a secondary particle structure and having a grain size of 206 nm, and a second lithium-transition metal composite oxide particle (Particle 2-2) having a secondary particle structure and having a grain size of 248 nm were obtained by mixing the precipitate with LiOH as a lithium source, and then performing a firing. The XRD peak ratio for each particle was calculated.

XRD analysis values and particle diameters of the lithium-transition metal composite oxide particles are shown in Table 2.

TABLE 1

| XRD(X-Ray Diffractometer) EMPYREAN | |
|---|---|
| Maker | PANalytical |
| Anode material | Cu |
| K-Alpha1 wavelength | 1.540598 Å |
| Generator voltage | 45 kV |
| Tube current | 40 mA |
| Scan Range | 10~120° |
| Scan Step Size | 0.0065° |
| Divergence slit | 1/4° |
| Antiscatter slit | 1/2° |

50 particles were randomly selected from an SEM cross-sectional image analysis, and an average value of lengths of a long axis and a short axis was defined as a particle diameter. An average particle diameter of 50 particles was calculated.

TABLE 2

| 구분 | | Grain Size (nm) | XRD peak ratio | | SEM Particle Diameter (μm) | D50 (μm) |
|---|---|---|---|---|---|---|
| | | | $100 \times I(110)/\{I(110) + I(003)\}$ | $100 \times A(110)/\{A(110) + A(003)\}$ | | |
| First lithium-transition metal composite | Particle 1-1 | 513 | 5.613 | 12.994 | 2.9 | 6.8 |
| | Particle 1-2 | 450 | 6.772 | 13.799 | 1.6 | 3.57 |

TABLE 2-continued

| | | Grain Size (nm) | 100 × I(110)/ {I(110) + I(003)} | 100 × A(110)/ {A(110) + A(003)} | SEM Particle Diameter (μm) | D50 (μm) |
|---|---|---|---|---|---|---|
| 구분 | | | | | | |
| oxide particle | Particle 1-3 | 397 | 7.727 | 16.001 | 1.5 | 3.5 |
| | Particle 1-4 | 438 | 8.974 | 16.119 | 1.6 | 4.4 |
| | Particle 1-5 | 255 | 4.214 | 12.01 | 1.4 | 3.2 |
| Second lithium-transition metal composite oxide particle | Particle 2-1 | 206 | 9.834 | 17.522 | 0.4 | 12.9 |
| | Particle 2-2 | 248 | 10.986 | 18.864 | 0.5 | 12 |

Fabrication of Secondary Battery

Secondary batteries were fabricated using the lithium-transition metal composite oxide particles of Table 2 based on combinations as shown in Table 3 as cathode active materials. Specifically, the cathode active material particle, Denka Black as a conductive additive and PVDF as a binder were mixed by a weight ratio of 97:2:1 to form a cathode slurry. The cathode slurry was coated, dried, and pressed on an aluminum substrate to form a cathode. A density of the cathode after the pressing was controlled as 3.55 g/cc or more.

An anode slurry was prepared by mixing 93 wt % of a natural graphite as an anode active material, 5 wt % of a flake type conductive additive KS6, 1 wt % of SBR as a binder, and 1 wt % of CMC as a thickener. The anode slurry was coated, dried, and pressed on a copper substrate to form an anode.

The cathode and the anode obtained as described above were notched by a proper size and stacked, and a separator (polyethylene, thickness: 25 μm) was interposed between the cathode and the anode to form an electrode cell. Each tab portion of the cathode and the anode was welded. The welded cathode/separator/anode assembly was inserted in a pouch, and three sides of the pouch (e.g., except for an electrolyte injection side) were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by dissolving 1M LiPF$_6$ in a mixed solvent of EC/EMC/DEC (25/45/30; volume ratio), and then 1 wt % of vinylene carbonate, 0.5 wt % of 1,3-propensultone (PRS), and 0.5 wt % of lithium bis (oxalato) borate (LiBOB) were added.

The lithium secondary battery as fabricated above was pre-charged by applying a pre-charging current (5 A) corresponding to 0.25 C for 36 minutes. After 1 hour, the battery was degased, aged for more than 24 hours, and then a formation charging-discharging (charging condition of CC-CV 0.2 C 4.2 V 0.05 C CUT-OFF, discharging condition of CC 0.2 C 2.5 V CUT-OFF) was performed.

TABLE 3

| | Cathode Active Material | SEM cross-section area ratio First Particle: Second Particle |
|---|---|---|
| Example 1 | Particle 1-1 used alone | — |
| Example 2 | Particle 1-1 (30 wt %) + Particle 2-1 (70 wt %) | 2:3.6 |
| Example 3 | Particle 1-2 (30 wt %) + Particle 2-1 (70 wt %) | 2:3.4 |
| Example 4 | Particle 1-3 (30 wt %) + Particle 2-1 (70 wt %) | 2:3.6 |
| Example 5 | Particle 1-4 (30 wt %) + Particle 2-1 (70 wt %) | 2:3.6 |
| Example 6 | Particle 1-5 (30 wt %) + Particle 2-1 (70 wt %) | 2:3.7 |
| Example 7 | Particle 1-1 (70 wt %) + Particle 2-1 (30 wt %) | 3.6:2 |
| Example 8 | Particle 1-1 (80 wt %) + Particle 2-1 (20 wt %) | 4.3:1.6 |
| Comparative Example 1 | Particle 2-1 used alone | — |
| Comparative Example 2 | Particle 2-2 used alone | — |

Experimental Example (1) Evaluation of Gas Generation at High Temperature

After charging (1 C 4.2V 0.1 C CUT-OFF) the lithium secondary batteries of Examples and Comparative Examples having the cathode composition of Table 2, the amount of gas generated after 1 week and after 4 weeks of storage in a 60° C. constant temperature chamber was measured using a gas chromatography (GC) analysis. To measure a total amount of the generated gas, a hole was formed through the vacuum chamber having a predetermined volume (V) and a pressure change was measured to calculate a volume of the generated gas.

(2) Evaluation of Gas Generation at High Temperature after Repeated Charging/Discharging Charging (CC-CV 1.0 C 4.2V 0.05 C CUT-OFF) and discharging (CC 1.0 C 2.7V CUT-OFF) of the lithium secondary batteries of Examples and Comparative Examples having the cathode composition of Table 2 were repeated 100 times and 300 times in a chamber at 45° C., and then the amount of gas was measured by the same method as that in the above (1).

(3) Evaluation of Life-Span at 45° C. (Capacity Retention)

Charging (CC-CV 1.0 C 4.2V 0.05 C CUT-OFF) and discharging (CC 1.0 C 2.7V CUT-OFF) of the lithium secondary batteries of Examples and Comparative Examples having the cathode composition of Table 2 were repeated 300 times in a chamber at 45° C., and then a capacity retention was measured by a percentage (%) of a discharge capacity at 300th cycle relative to a discharge capacity at 1st cycle.

(4) Evaluation of DCIR at Room Temperature

The lithium secondary batteries of Examples and Comparative Examples having the cathode composition of Table 2 were charged/discharged twice (SOC 100%) under conditions of 25° C., 0.5 C and CC-CV, and then charged again under conditions of 0.5 C CC-CV. Subsequently, 0.5 C discharge was performed until the SOC reached 50%. Thereafter, a voltage (a first voltage) was measured after being left for 30 minutes.

Thereafter, i) 1 C, left for 40 seconds after discharging for 10 seconds, ii) 0.75 C, charged for 10 seconds, and left for 40 seconds, and then a voltage (a second voltage) was measured. DCIR was measured using a difference between the first voltage and the second voltage.

The results were shown in Table 4 below.

TABLE 4

| | Gas Generation at high temperature (mL) | | Gas Generation after Repeated Charging/Discharging (mL) | | Capacity Retention (%) | DCIR at room temperature (mΩ) |
|---|---|---|---|---|---|---|
| | after 1 week | after 4 weeks | after 100 cycles | after 300 cycles | | |
| Example 1 | 8.9 | 12.1 | 4.1 | 9.2 | 93.9 | 4.14 |
| Example 2 | 10.3 | 18.9 | 3.2 | 18.8 | 93.2 | 4.18 |
| Example 3 | 9.7 | 18.3 | 8.3 | 17.8 | 87.8 | 4.20 |
| Example 4 | 18.3 | 26.9 | 9.8 | 24.9 | 84.9 | 4.37 |
| Example 5 | 11.9 | 20.8 | 9.3 | 22.07 | 86.8 | 4.54 |
| Example 6 | 13.8 | 22.2 | 10.0 | 25.2 | 84.5 | 4.12 |
| Example 7 | 9.5 | 14.9 | 4.8 | 21.3 | 91.2 | 4.15 |
| Example 8 | 12.9 | 21.6 | 5.3 | 24.8 | 87.2 | 4.19 |
| Comparative Example 1 | 24.2 | 43.7 | 23.3 | 29.8 | 80.1 | 4.21 |
| Comparative Example 2 | 14.5 | 25.7 | 10.6 | 26.2 | 85.8 | 4.72 |

Referring to Table 4, in Examples in which the lithium-transition metal composite oxide having a crystal grain size of 250 nm or more and satisfying the XRD peak ratio of a predetermined value or less was used, the gas generation was suppressed and improved capacity retention and DCIR property at room temperature were obtained when compared to those of Comparative Examples.

In the case of Example 8, as an amount of the first lithium-transition metal composite oxide particle having the single particle shape increased, the gas generation was suppressed, but the capacity retention and resistance properties were slightly degraded.

What is claimed is:

1. A cathode active material for a lithium secondary battery comprising a lithium-transition metal composite oxide particle having a single particle shape having a crystallographic single crystal or polycrystalline structure,
wherein a crystal grain size of the lithium-transition metal composite oxide particle measured by an XRD analysis is in a range from 250 nm to 600 nm, and
an XRD peak intensity ratio defined by Equation 2 of the lithium-transition metal composite oxide particle is 9.8% or less:

$$XRD \text{ peak intensity ratio } (\%) = 100 \times I(110)/\{I(110)+I(003)\} \quad [\text{Equation 2}]$$

wherein, in Equation 2, I(110) is a maximum height of a peak corresponding to a (110) plane by the XRD analysis of the lithium-transition metal composite oxide particle, and I(003) is a maximum height of a peak corresponding to a (003) plane by the XRD analysis of the lithium-transition metal composite oxide particle.

2. The cathode active material for a lithium secondary battery according to claim 1, wherein the crystal grain size is measured by Equation 1 below:

$$L = 0.9\lambda/\beta\cos\theta \quad [\text{Equation 1}]$$

wherein, in Equation 1, L is the crystal grain size, λ is an X-ray wavelength, β is a half width of a peak corresponding to the (003) plane, and θ is a diffraction angle.

3. The cathode active material for a lithium secondary battery according to claim 1, wherein the crystal grain size of the lithium-transition metal composite oxide particle is in a range from 300 nm to 600 nm.

4. The cathode active material for a lithium secondary battery according to claim 1, wherein the XRD peak intensity ratio of the lithium-transition metal composite oxide particle is in a range from 4 to 9.8.

5. The cathode active material for a lithium secondary battery according to claim 1, wherein an XRD peak area ratio defined by Equation 3 of the lithium-transition metal composite oxide particle is 17% or less:

$$XRD \text{ peak area ratio } (\%) = 100 \times A(110)/\{A(110)+A(003)\} \quad [\text{Equation 3}]$$

wherein, in Equation 3, A(110) is a peak area of a peak corresponding to the (110) plane by the XRD analysis of the lithium-transition metal composite oxide particle, and A(003) is a peak area of a peak corresponding to the (003) plane by the XRD analysis of the lithium-transition metal composite oxide particle.

6. The cathode active material for a lithium secondary battery according to claim 5, wherein the XRD peak area ratio of the lithium-transition metal composite oxide particle is in a range from 10% to 17%.

7. The cathode active material for a lithium secondary battery according to claim 1, wherein the cathode active material comprises a first lithium-transition metal composite oxide particle having a single particle shape having a crystallographic single crystal or polycrystalline structure, and a second lithium-transition metal composite oxide particle having a secondary particle structure,
wherein a crystal grain size of the first lithium-transition metal composite oxide particle measured by an XRD analysis is in a range from 250 nm to 600 nm, and the XRD peak intensity ratio of the first lithium-transition metal composite oxide particle is 9.8% or less.

8. The cathode electrode active material for a lithium secondary battery according to claim 7, wherein the second lithium-transition metal composite oxide particle has a crystal grain size less than 250 nm measured by the XRD analysis.

9. The cathode active material for a lithium secondary battery according to claim 7, wherein the XRD peak intensity ratio of the second lithium-transition metal composite oxide particle exceeds 9.8%.

10. The cathode active material for a lithium secondary battery according to claim 7, wherein a weight ratio of the first lithium-transition metal composite oxide particle and the second lithium-transition metal composite oxide particle is from 3:7 to 7:3.

11. The cathode active material for a lithium secondary battery according to claim 7, wherein a particle diameter (D50) of the second lithium-transition metal composite oxide particle is larger than a particle diameter of the first lithium-transition metal composite oxide particle.

12. The cathode active material for a lithium secondary battery according to claim 1, wherein the lithium-transition metal composite oxide particle has a composition represented by Chemical Formula 1:

$$Li_xNi_aM_{1-a}O_{2+z}$$ [Chemical Formula 1]

wherein, in Chemical Formula 1, $0.9 \leq x \leq 1.2$, $0.6 \leq a \leq 0.99$, $-0.1 \leq z \leq 0.1$, and M is at least one element selected from the group consisting of Na, Mg, Ca, Y, Ti, Zr, Hf, V, Nb, Ta, Cr, Mo, W, Mn, Co, Fe, Cu, Ag, Zn, B, Al, Ga, C, Si, Sn and Zr.

13. The cathode active material for a lithium secondary battery according to claim 12, $0.8 \leq a \leq 0.95$ in Chemical Formula 1.

14. A lithium secondary battery, comprising:
a cathode comprising a cathode active material layer that includes the cathode active material according to claim 1; and
an anode facing the cathode.

15. The lithium secondary battery according to claim 14, wherein the cathode active material comprises first lithium-transition metal composite oxide particles and second lithium-transition metal composite oxide particles having a secondary particle shape,
wherein a crystal grain size of the first lithium-transition metal composite oxide particles measured by an XRD analysis is in a range from 250 nm to 600 nm, and the XRD peak intensity ratio of the first lithium-transition metal composite oxide particles is 9.8% or less.

16. The lithium secondary battery according to claim 15, wherein a ratio of a cross-sectional area of the first lithium-transition metal composite oxide particles and a cross-sectional area of the second lithium-transition metal composite oxide particles in a scanning electron microscope (SEM) cross-sectional image of the cathode active material layer is from 1:4.5 to 4.5:1.

17. The lithium secondary battery according to claim 15, wherein a ratio of a cross-sectional area of the first lithium-transition metal composite oxide particles and a cross-sectional area of the second lithium-transition metal composite oxide particles in a scanning electron microscope (SEM) cross-section of the cathode active material layer is from 2:3.7 to 3.7:2.

* * * * *

UNITED STATES PATENT AND TRADEMARK OFFICE
CERTIFICATE OF CORRECTION

| | | |
|---|---|---|
| PATENT NO. | : 12,087,945 B2 | Page 1 of 1 |
| APPLICATION NO. | : 17/338317 | |
| DATED | : September 10, 2024 | |
| INVENTOR(S) | : Sang Han Lee et al. | |

It is certified that error appears in the above-identified patent and that said Letters Patent is hereby corrected as shown below:

On the Title Page

Item (73), for the Assignee, please replace "SK INNOVATION CO., LTD." with --SK ON CO., LTD.--.

Signed and Sealed this
Fifth Day of November, 2024

Katherine Kelly Vidal
*Director of the United States Patent and Trademark Office*